US010991391B1

(12) United States Patent
Tang et al.

(10) Patent No.: US 10,991,391 B1
(45) Date of Patent: Apr. 27, 2021

(54) CIRCUITS AND METHODS FOR MODIFYING THE WRITE CURRENT WAVEFORM TO IMPROVE TRACK DENSITY IN HDD

(71) Applicant: Headway Technologies, Inc., Milpitas, CA (US)

(72) Inventors: Yuhui Tang, Milpitas, CA (US); Ying Liu, San Jose, CA (US); Takeo Kagami, Nagano (JP); Mei Ki Yeung, Hong Kong (HK); Sui Yan Chan, Hong Kong (HK)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/781,358

(22) Filed: Feb. 4, 2020

(51) Int. Cl.
  *G11B 5/09* (2006.01)
  *G11B 20/10* (2006.01)
  *G11B 20/14* (2006.01)

(52) U.S. Cl.
  CPC .. *G11B 20/10194* (2013.01); *G11B 20/10027* (2013.01); *G11B 20/10222* (2013.01); *G11B 20/10481* (2013.01); *G11B 20/1403* (2013.01); *G11B 2220/2516* (2013.01)

(58) Field of Classification Search
  None
  See application file for complete search history.

(56) References Cited

U.S. PATENT DOCUMENTS

| 6,301,068 B1 | 10/2001 | Ionescu |
| 6,798,591 B2 | 9/2004 | Barnett et al. |
| 6,826,003 B1 | 11/2004 | Subrahmanyam |
| (Continued) | | |

FOREIGN PATENT DOCUMENTS

WO    WO-0129829 A1 *   4/2001  ............... G11B 5/09

OTHER PUBLICATIONS

"A 1.2Gb/s Write Driver with Pre-emphasis Overshoot Control Optimized for High Density HDD Applications," by Y. Hayashi et al., IEEE 2005 Custom Integrated Circuits Conference, Sep. 21, 2005, pp. 519-522.

(Continued)

*Primary Examiner* — Peter Vincent Agustin
(74) *Attorney, Agent, or Firm* — Saile Ackerman LLC; Stephen B. Ackerman; Billy J. Knowles

(57) ABSTRACT

A preamplifier has a pre-compensation circuit that optimizes the write current in a low current range of less than 30 mA. The pre-compensation circuit maintains the peak current with a high overshoot current amplitude for achieving an optimized areal density capability to equalize the erase widths for the bit lengths of the encoded data with bit lengths greater than three clock time periods with encoded data with a bit length of the two clock time period. Alternately, the pre-compensation circuit has an overshoot generator that determines the optimum amplitude of the overshoot current for the bit-lengths for the encoded data. An overshoot data synchronizer is connected to a read current preamplifier to receive a pseudorandom read data signal that is applied to the overshoot generator to enable the different overshoot current amplitude depending on the bit length of the encoded data. The pre-compensated data current is transferred to the write head.

8 Claims, 10 Drawing Sheets

(56) References Cited

U.S. PATENT DOCUMENTS

| | | | |
|---|---|---|---|
| 6,870,697 B2 | 3/2005 | Ikekame et al. | |
| 7,154,687 B2 | 12/2006 | Ikekame et al. | |
| 7,656,603 B1 | 2/2010 | Xing | |
| 8,687,311 B2 | 4/2014 | Dakroub et al. | |
| 8,792,197 B1 | 7/2014 | Wilson et al. | |
| 9,111,561 B1 | 8/2015 | Contreras et al. | |
| 9,275,656 B1 | 3/2016 | Contreras et al. | |
| 2003/0067700 A1* | 4/2003 | Barnett | G11B 5/02 360/46 |
| 2003/0184901 A1* | 10/2003 | Takahashi | G11B 5/02 360/46 |
| 2005/0190476 A1* | 9/2005 | Wilson | G11B 5/465 360/46 |
| 2005/0207053 A1* | 9/2005 | Barnett | G11B 5/09 360/68 |
| 2008/0239558 A1* | 10/2008 | Kuehlwein | G11B 5/02 360/77.08 |
| 2013/0128375 A1* | 5/2013 | Livshitz | G11B 20/10222 360/48 |
| 2015/0062737 A1* | 3/2015 | Wilson | G11B 5/09 360/48 |
| 2016/0260454 A1 | 9/2016 | Dina | |

OTHER PUBLICATIONS

"Characterization of Write-Signal Efficiency Utilizing Write-Current Dynamic Wave-Shaping," by John Contreras et al., IEEE Transacitons on Magnetics, vol. 53, No. 2, Feb. 2017, 7 pages.

* cited by examiner

CIRCUITS AND METHODS FOR MODIFYING THE WRITE CURRENT WAVEFORM TO IMPROVE TRACK DENSITY IN HDD

TECHNICAL FIELD

This disclosure relates generally to magnetic hard disc drive data storage systems. More particularly, the present invention relates to circuits and methods for pre-compensation of encoded data for writing data to the magnetic hard disc drive at high data rates.

BACKGROUND

FIG. 1 is a representation of a magnetic hard disk drive 10 of the prior art. Data from an external device is applied to the magnetic hard disk drive 10 through the data input terminal 100. Data is transferred from the magnetic disk drive 10 through the data output terminal 185 and to an external device.

The data input signal 100 is applied to the disk controller 20. The disk controller 20 encodes the data input signal 100 with a digital line code such as a "non-return to zero inverted" (NRZI) code that is structured for writing the magnetic disk 50. The formatted data input is transferred to the preamplifier for conversion to the head current used to generate the magnetic field for writing the magnetic disk 50.

Further, the controller 20 receives the data read from the magnetic disk 50 through the preamplifier 30. The preamplifier 30 and the controller 20 conditions the signals read from the magnetic disk 50 to regenerate the NRZI encoded data. The controller 20 then decodes the NRZI encoded data to generate the output data. The output data is transferred through the terminal 185 to the external device. Control data is applied to the controller 20 through the terminal 135 for communicating control information such as data request, I/O read/write, channel ready, address, data acknowledge, etc.

A head arm or head stack assembly 25 has the magnetic read/write head 55 mounted at a distal end of the arm-head assembly 25. A voice coil 35 is mounted at an opposite end of the head arm or head stack assembly 25. The voice coil 35 receives control signals from the controller 20 for causing the magnetic read/write head assembly 55 to move across the disk 50. The magnetic read/write head 55 is then able to read from and record to the disk 50.

The preamplifier 30 is mounted on the head arm assembly 25. A trace 45 is connected from the preamplifier 30 to the magnetic read/write head 55 to transfer the data and control signals between the preamplifier 30 and the magnetic read/write head 55. The trace 45 is also secured to the head arm assembly 25.

FIG. 2 is a block diagram of a controller 20 and preamplifier 30 of the prior art. The input data 100 is transferred to a controller circuit 105 and is applied to an Error Correction Code (ECC) circuit 110 that generates an ECC code from the input data and is appended to the input data. The input data with the appended ECC Code is then is an input to an NRZI write encoder 115 that the input data 100 with the appended ECC code to an NRZI format acceptable to the hard disk media for writing the data to the hard disk. The NRZI encoded data is then transferred to a preamplifier 120 and thus to a pre-compensation circuit 125 for conditioning the encoded data to accommodate the transmission line characteristics of the trace 45 of FIG. 1 and the requirements of the magnetic disk 60 for correctly writing the data efficiently to the magnetic disk 60.

The pre-compensated data is applied to the write current driver 125 and the overshoot amplitude driver 130. The structure of the pre-compensated waveform includes the write current ($I_W$), overshoot amplitude (OSA), and overshoot duration (OSD). The preamplifier 120 pre-compensates data current waveform fine-tuning $I_W$/OSA/OSD (IAD) settings to achieve the best bits per inch (BPI), tracks per inch (TPI) and areal density capability (ADC) and thus optimizing the IAD settings. In general, the write current driver 125 and the overshoot amplitude driver 130 of the preamplifier 120 set the same write current ($I_W$), overshoot amplitude (OSA), and overshoot duration (OSD) for different frequency or bit length in the random recording bit sequence. Due to the dynamic magnetization switching in the write head 145 shows a strong dependence on the frequency, the magnetic erase widths (EW) varies for different frequencies/bit lengths, especially at a high data rate. In general, the lower frequencies/longer bits show wider erase width EW compared to the narrower erase width EWs in the higher frequencies/shorter bits.

The write current $I_W$ with the overshoot amplitude OSA and overshoot duration OSD are transferred to the PMR write head 15 in the read/write head assembly 140. The write current $I_W$ with the overshoot amplitude OSA and overshoot duration OSD is applied to the magnetic disk 60 to record the pre-compensated data to the magnetic disk 60.

The write control data 150 is received by the disk controller circuit 155 for supervising the encoding, decoding, synchronization control of the hard disk drive 10 of FIG. 1. The disk control circuit 155 provides a spindle motor driver control signal for activating a spindle motor driver 165 for turning the spindle motor for spinning the disk 50 of FIG. 1. The disk control circuit 155 also provides a voice coil driver 160 for actuating the voice coil to move the arm-head assembly over the surface of the disk 50 of FIG. 1.

Read data sensed by the read head 170 is transferred to the read current preamplifier 175, where the signals are amplified and transmitted to the read analog to digital (N/D) converter 180 where the data voltage signals are converted to a sequence of digital data. The converted digital data is transferred to the NRZI read decoder 185 for converting the digital read data to the decoded read data with the attached ECC code. The read data with the attached ECC code is applied to an ECC correction circuit 190 for correction of any errors that occur in the transmission path during writing, on the writing of the disk 50, and in the transmission path during reading. The corrected output data 195 from the ECC correction circuit 190 is transferred to the external device.

FIG. 3 is a plot of the write current waveform at the output of the preamplifier 120 to the input of the perpendicular magnetic recording (PMR) head 145 of the prior art. The waveform shows a pattern with two time periods (2T) of two zeroes, followed by a single time period (1T) of a single one, then three time periods (3T) of three zeroes, then two time periods (2T) of two ones, then one time period (1T) of a single zero, and then four time periods of four ones. There are three key control parameters in constructing the waveform, the write current $I_W$, the overshoot amplitude OSA, and the overshoot duration OSD. The write current $I_W$ sets the sufficient current amplitude to drive the main pole of the PMR head 145 to generate the magnetic recording field (Hy). The overshoot amplitude OSA and overshoot duration OSD are used to boost the magnetic recording field rise time and thus write sharp transitions between sequential bits, especially at high data rate recording. In the preamplifier of the prior art, write current $I_W$, the overshoot amplitude OSA, and overshoot duration OSD settings are independent of frequencies. Thus, the write current $I_W$ and the peak current Ipeak, which equals to the write current $I_W$ plus the overshoot amplitude OSA (Ipeak+OSA) are identical for all different frequencies.

FIG. 4 is a 2D map of recorded bit patterns on the recording media corresponding to the dynamic current waveform in FIG. 3 of the prior art. The rise time of the magnetic field (Hy) from the PMR head 145 depends on the dynamics of PMR head 145 and is approximately 50 ps to 200 ps in current state-of-the-art PMR head 150 design. The actual magnetic field (Hy) amplitudes and cross-track profiles are not identical for different frequencies under the identical the write current ($I_W$), overshoot amplitude (OSA), and overshoot duration (OSD) (IAD) setting for all frequencies. Typically, long bits, which is greater than three clock time periods (>=3T), show wider erase width (EW) than the erase widths of the two clock time period (2T) bits and the one clock time period (1T) bits have a much narrower erase width (EW) than that of the two clock time period (2T) bits. Areal density capability (ADC) in PMR heads 145, is the product of on track linear density bit per inch (BPI) and cross-track density track per inch (TPI). Both better track linear density bit per inch (BPI) and cross-track density track per inch (TPI) are preferred. It's known in the art that reducing the erase width EW of long bits can improve the cross track density track per inch (TPI). However, in current practice, the write current ($I_W$) is greater than or equal to 30 mA to maintain the healthy overwrite (OW).

Further, in current practice, most of the write current ($I_W$), overshoot amplitude (OSA), and overshoot duration (OSD) (IAD) optimization schemes set the low boundary of write current ($I_W$) range is 30 mA. With such constraint, reducing erase width (EW) means low overshoot amplitude (OSA) and low peak current Ipeak, which will impact the magnetic field (Hy) of the one clock time period (1T) bits and the two clock time period (2T) bits and hurt track linear density bit per inch (BPI). Hence there is no areal density capability (ADC).

SUMMARY

An object of this disclosure is to provide circuits and methods for generating a pre-compensated current waveform that sets the write current, overshoot amplitude, and overshoot duration, referred to as IAD, differently for all bits with different frequencies/bit lengths of the encoded input data.

An additional object of this disclosure is to provide circuits and methods for maintaining constant erase widths for different frequencies/bit lengths.

Further, an additional object of this disclosure is to provide circuits and methods for generating a pre-compensated current waveform that sets the write current ($I_W$) sweeping range such that it is always less than 30 mA, preferably from approximately 15 mA to 20 to maintain the erase width (EW) as a constant width.

Still further, an additional object of this disclosure is to provide circuits and methods for maintaining the overshoot amplitude adjustment range in a limited region to generate the necessary peak current ($I_{PK}$) required to have an on-track bit-error-rate (BER) that is sustainable since the tuning window for overshoot amplitude is sufficiently wide.

To accomplish at least one of the objects of this disclosure, a preamplifier is configured for optimizing the write current is less than 30 mA and preferably approximately 15 mA to 20 mA. The preamplifier is further configured for maintaining the peak current with a high overshoot amplitude for achieving an optimized areal density capability to equalize the erase widths for the bit lengths of the encoded data with bit lengths greater than three clock time periods with bit length of the two clock time period and with bit lengths of one clock time period.

In some embodiments that accomplish at least one of the objects of this disclosure, a method for writing encoded data to a hard disk drive begins by optimizing the write current is less than 30 mA and preferably approximately 15 mA to 20 mA. The peak current ($I_{PEAK}$) is maintained with a high overshoot amplitude for achieving an optimized areal density capability to equalize the erase widths for the bit lengths of the encoded data with bit lengths greater than three clock time periods with bit length of the two clock time period and with bit lengths of one clock time period.

In various embodiments that accomplish at least one of the objects of this disclosure, a preamplifier has a pre-compensation circuit that includes a write current source that is configured for optimizing the write current to be less than 30 mA and preferably approximately 15 mA to 20 mA. The write current source is connected to an overshoot generator that determines the optimum amplitude of the overshoot for the frequencies or bit-lengths for the encoded data. An overshoot data synchronizer is connected to a read current preamplifier to receive a pseudorandom read data signal that is applied to the overshoot generator to enable the different overshoot amplitude depending on the bit length of the encoded data. The pre-compensated data signal is then applied to a write driver to transfer the pre-compensated data current to the write head of, the read/write head assembly.

In various embodiments that accomplish at least one of the objects of this disclosure, a method for pre-compensating an encoded data signal begins with optimizing the write current to be less than 30 mA and preferably approximately 15 mA to 20 mA. The optimum amplitude of the overshoot current for the frequencies or bit-lengths for the encoded data is then determined. An overshoot current data synchronizing signal is generated as a pseudorandom read data signal that is dependent on the bit length of the encoded data. The overshoot current data synchronizing signal is then applied to the encoded data signal with the write current to form the pre-compensated data signal. The pre-compensated data signal is then transferred to the write head of the read/write head assembly.

DETAILED DESCRIPTION

This disclosure includes two embodiments, and in the two embodiments, a write current is limited to a low level. In the present day technology, the write current is limited to less than 30 mA and preferably approximately 15 mA to 20 mA. In the first embodiment, a pre-compensation circuit is configured for setting the overshoot current amplitude for maintaining a peak current amplitude required for writing the data to the hard disk drive.

In the second embodiment, the pre-compensation circuit is configured for limiting the write current to the low level of less than 30 mA and preferably approximately 15 mA to 20 mA. The second embodiment of the pre-compensation circuit is configured to increase the overshoot current amplitude to maintain the same peak current. The pre-compensation circuit is further configured to eliminate any difference in erase width for the different pulse widths or frequencies of the data to achieve the best possible areal density capability of the density of the magnetic hard disk.

Figure 5:
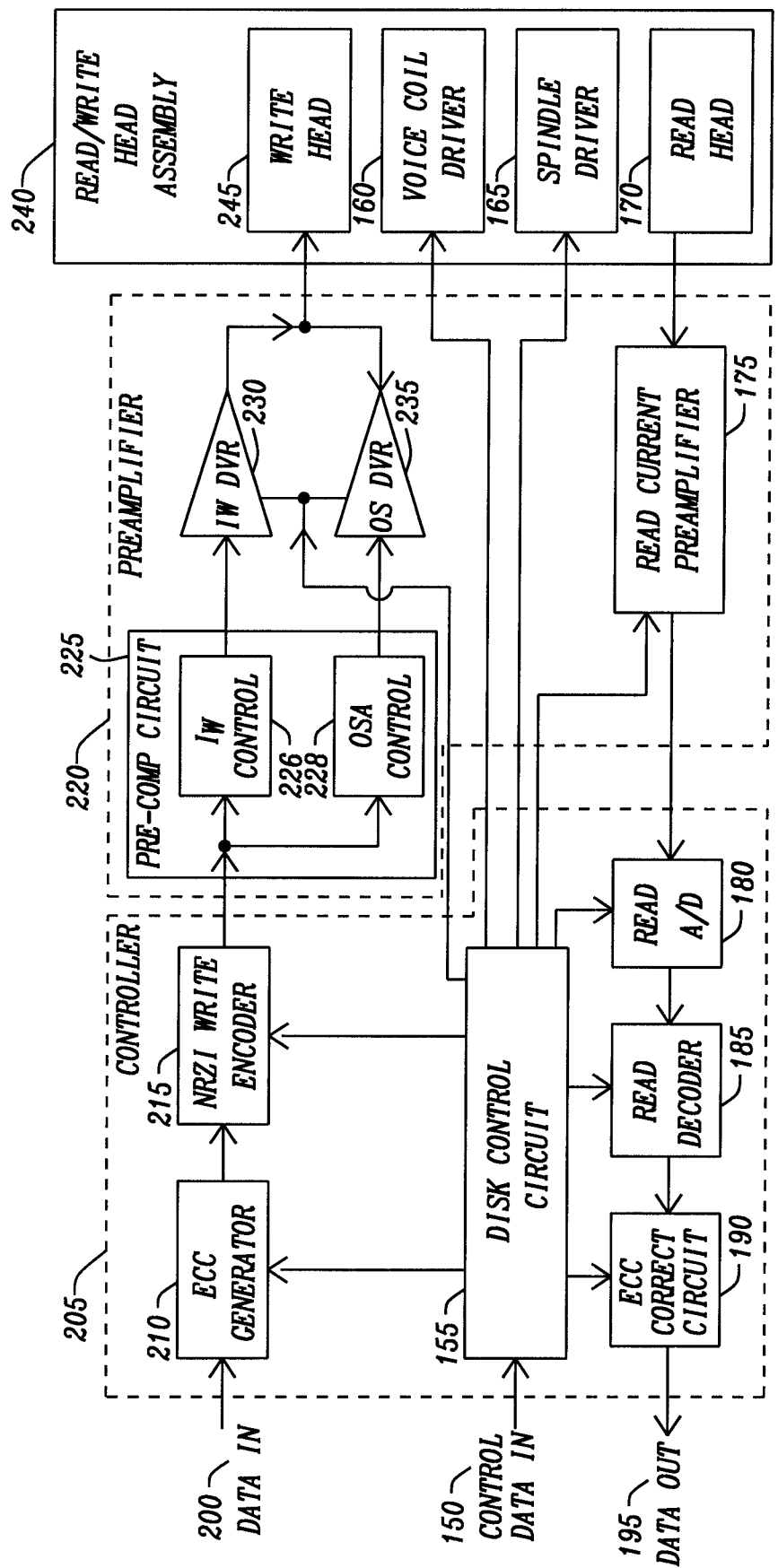
FIG. 5 is a block diagram of a controller and preamplifier embodying the principles of the present disclosure.

FIG. 5 is a block diagram of a controller and preamplifier embodying the principles of the present disclosure. The structure of the controller and preamplifier embodying the principles of the present disclosure is similar to that of the controller and preamplifier of the prior art. The input data 200 is transferred to a controller circuit 205 and is applied to an Error Correction Code (ECC) circuit 210 that generates an ECC code from the input data that is appended to the input data. The input data with the appended ECC Code is then an input to an NRZI write encoder 215 that the input data 200 with the appended ECC code to an NRZI format acceptable to the hard disk media for writing the data to the hard disk. The NRZI encoded data is then transferred to a preamplifier 220 and thus to a pre-compensation circuit 225 for conditioning the encoded data to accommodate the transmission line characteristics of the trace 45 of FIG. 1 and the requirements of the magnetic disk 60 for correctly writing the data efficiently to the magnetic disk 60. In the case of the present embodiment, the pre-compensation circuit 225 has a write current control circuit 226 that is configured for receiving the NRZI encoded data and adjusts the magnitude of the write current $I_W$ to a low level of less than 30 ma. The pre-compensation circuit 225 has an overshoot current amplitude control circuit 228 that is configured for receiving the NRZI encoded data and adjusting the amplitude of the overshoot current such that the sum of the write current $I_W$ and the overshoot current OSA is equal to the peak current $I_{PEAK}$.

The pre-compensated data is applied to the write current driver 230 and the overshoot driver 235. The structure of the pre-compensated waveform includes the write current ($I_W$) set to lower the current level of less than 30 mA and preferably approximately 15 mA to 20 mA, overshoot current amplitude (OSA), and overshoot current duration (OSD) to boost the magnetic recording field rise time and write sharp transitions between sequential bits.

The write current $I_W$ with the overshoot current amplitude OSA and overshoot current duration OSD are transferred to the PMR write head 15 in the read/write head assembly 240. The write current $I_W$ with the overshoot current amplitude OSA and overshoot current duration OSD is applied to the magnetic disk 60 to record the pre-compensated data to the magnetic disk 60.

Figure 1:
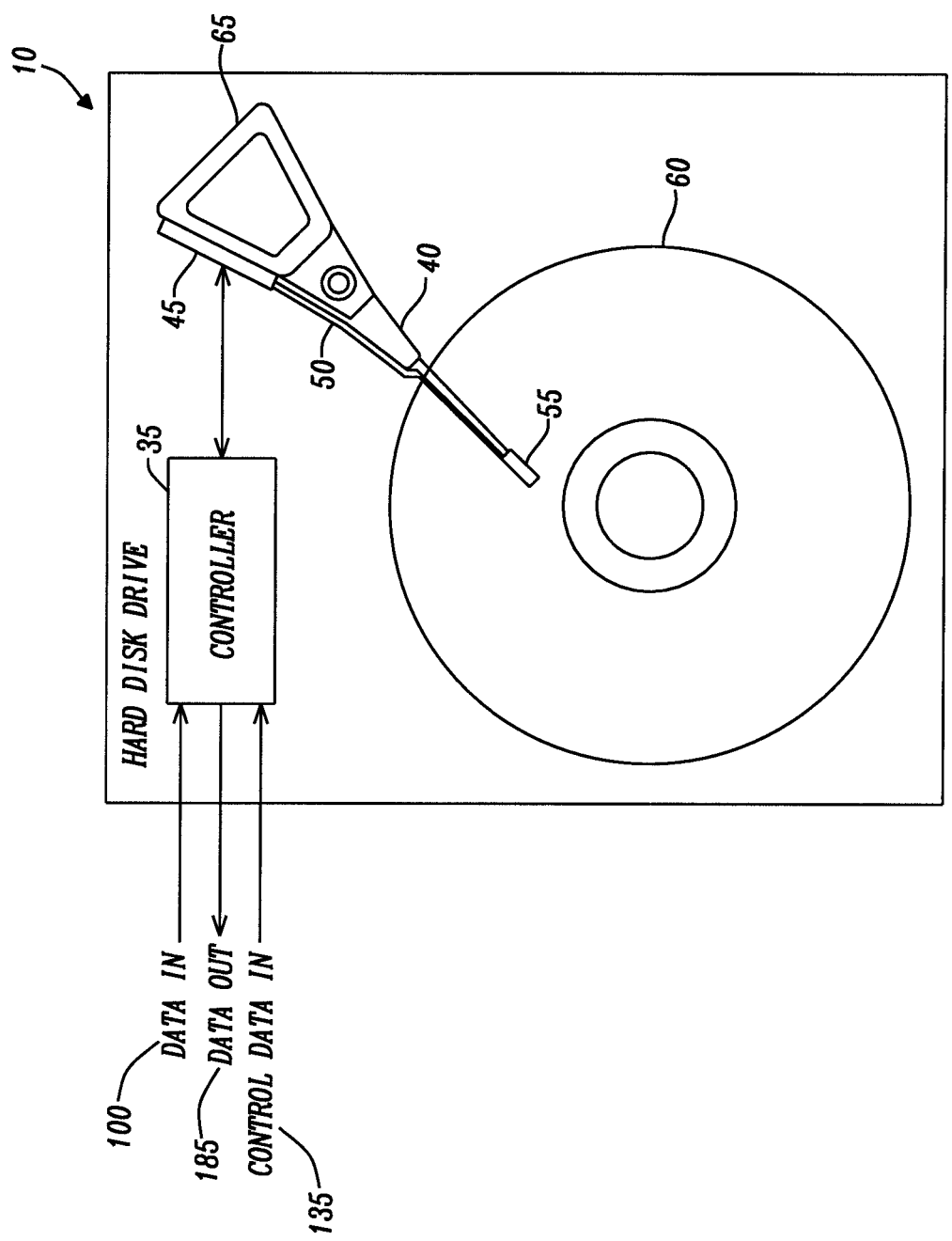
FIG. 1 is a representation of a magnetic hard disk drive of the prior art.
Figure 2:
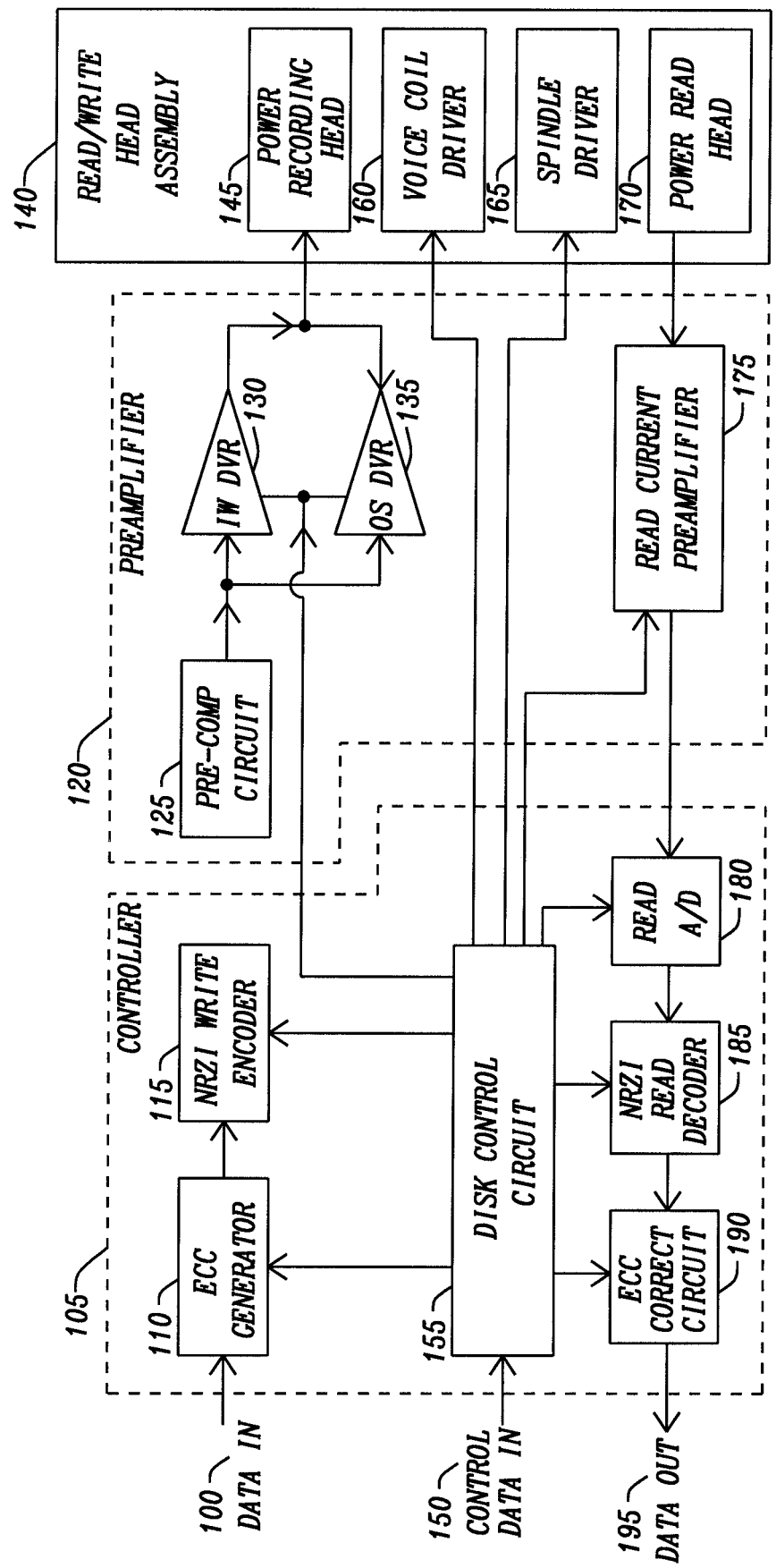
FIG. 2 is a block diagram of a controller and preamplifier of the prior art.
Figure 3:
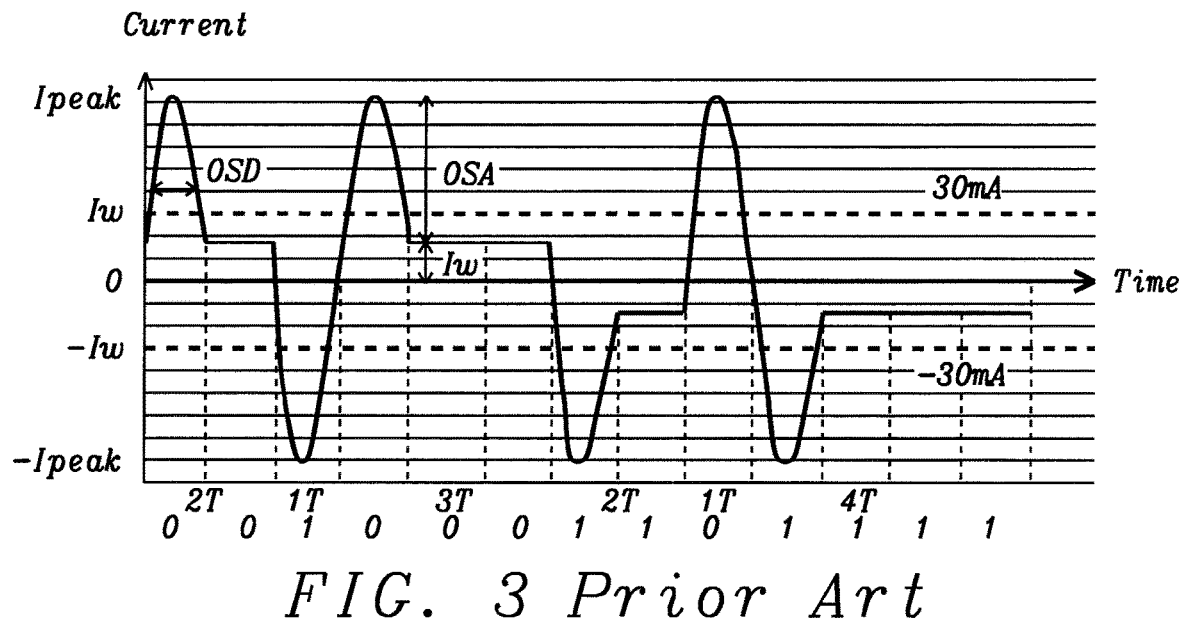
FIG. 3 is a plot of the write current waveform at the output of the preamplifier to the input of the perpendicular magnetic recording (PMR) head of the prior art.
Figure 4:
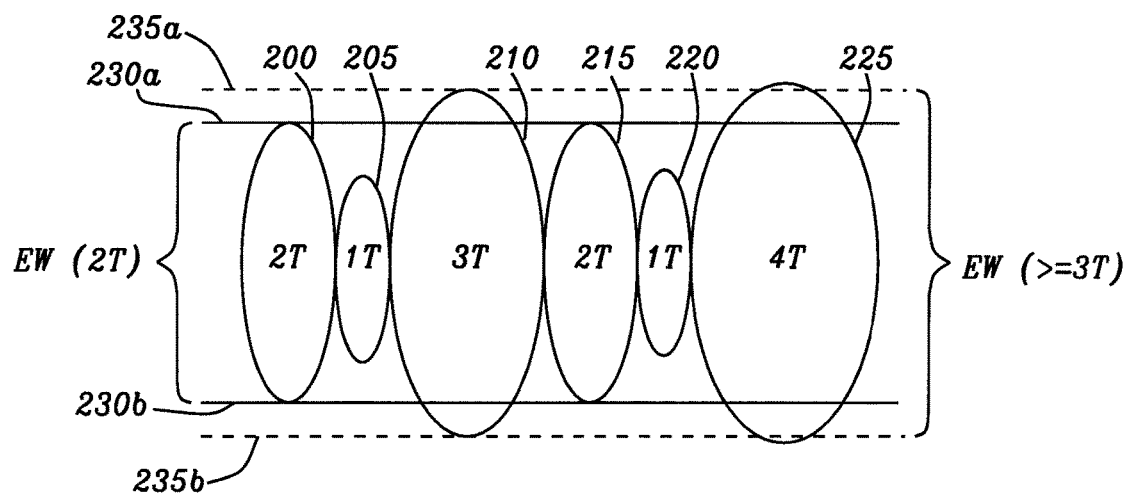
FIG. 4 is a 2D map of recorded bit patterns on the recording media corresponding to the dynamic current waveform in FIG. 3 of the prior art.

The write control path is the same as that of FIG. 2, where the write control data 150 is received by the disk controller circuit 155 for supervising the encoding, decoding, synchronization control of the hard disk drive 10 of FIG. 1.

The read data path is identical to that of FIG. 2, where the read data sensed by the read head 270 is transferred to the read current preamplifier 275 through the read path as described in FIG. 2.

Figure 6:
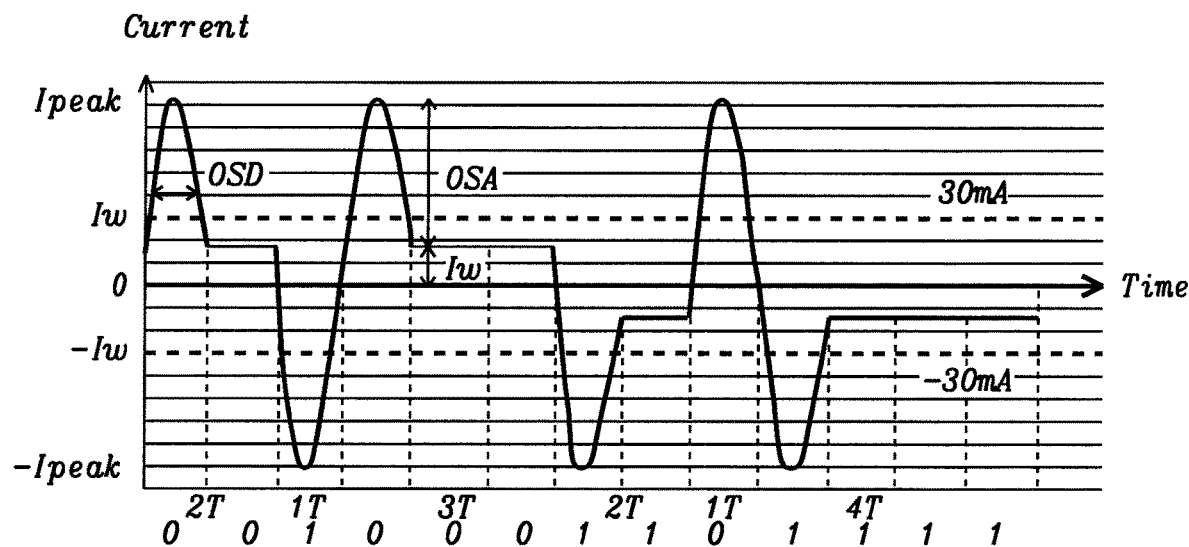
FIG. 6 is a plot of the write current waveform at the output of the preamplifier to the input of the perpendicular magnetic recording (PMR) head of the controller and preamplifier of FIG. 5 embodying the principles of the present disclosure.

FIG. 6 is a plot of the write current waveform at the output of the preamplifier 220 to the input of the perpendicular magnetic recording (PMR) head assembly 240 of the embodying the principles of the present disclosure. The data, as shown, is an NRZI bit pattern (0010001101111) that is applied to the write current control circuit 226 and the overshoot current amplitude control circuit 228. The write current control circuits 226 sets the write current $I_W$ to a low level that is less than 30 mA and preferably approximately 15 mA to 20 mA. The overshoot current amplitude control circuit sets the amplitude and duration of the overshoot current pulse to be set such that the data current waveform is optimized for the best bits per inch (BPI), tracks per inch (TPI) and areal density capability (ADC). The pulse width is determined by the number of 1's or 0's before a change to the opposite digit, as is defined in the NRZI encoding. The first two zeroes form a pulse that is 2 time-periods wide. The first one digit is a single time-period wide with opposite polarity. The second three zeroes are three-time periods wide with a positive polarity. The next two ones are two time-period wide with a negative polarity. The next zero is one time-period wide with a positive polarity. The next four ones are four time-periods wide with a negative polarity. The first time-period of each of the sets of digits is a pulse with an amplitude equal to the peak current $I_{PEAK}$ that is the sum of the write current $I_W$ and the overshoot current. It is noted that the peak current $I_{PEAK}$ for each of the sets of digits is constant.

Figure 7:
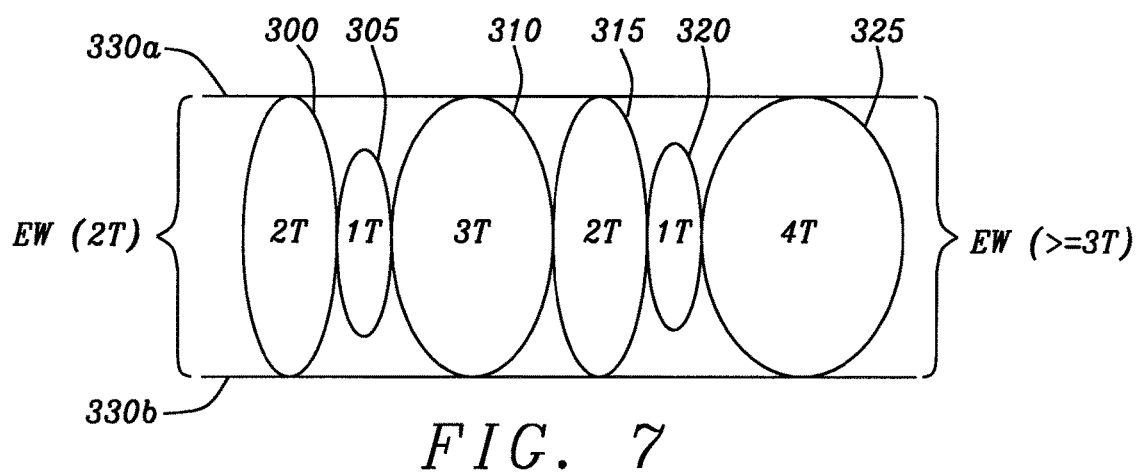
FIG. 7 is a 2D map of recorded bit patterns on the recording media corresponding to the dynamic current waveform in the controller and preamplifier embodying the principles of the present disclosure.

FIG. 7 is the 2D map of recorded bit patterns on the recording media corresponding to the dynamic current waveform in the controller 205 and preamplifier 220, embodying the principles of the present disclosure. The bit sequences are written on media with the current waveform of FIG. 6. The erase width of the bit sequences having the same data value and thus taking several time-periods is reduced to be the same as the erase width as a bit sequence having two time-periods for improving the track density or tracks per inch (TPI). The recorded bit patterns 300, 310, and 320 have a positive polarity, and the recorded bit patterns 305, 315, and 325 have a negative polarity. The recorded bit patterns 305 and 320 each occupy a single time-period. The recorded bit patterns 300 and 315 each occupy two time-periods. The recorded bit pattern 310 occupies three time-periods, and the recorded bit pattern 325 occupies four time-periods. The recorded bit patterns 300, 310, 315, 325 are all set to have the same erase width 330a and 330b for improving the track density or TPI as described above.

Figure 8:
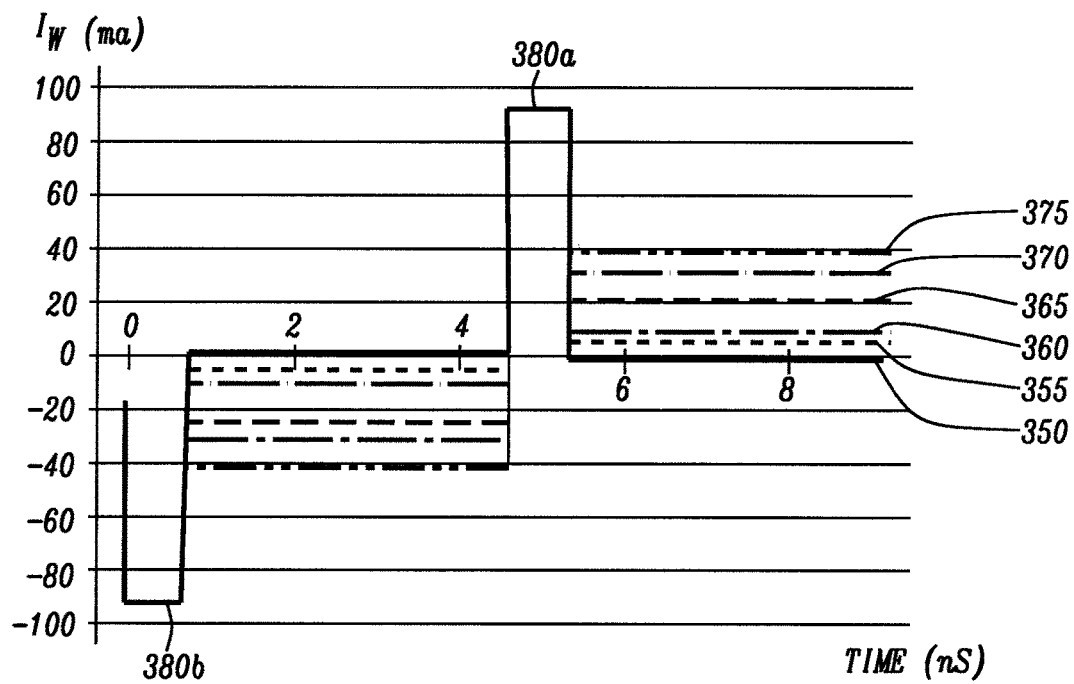
FIG. 8 is a plot of the write current waveform with a higher overshoot current amplitude set to maintain the same peak current using the controller and preamplifier embodying the principles of the present disclosure.
Figure 9:
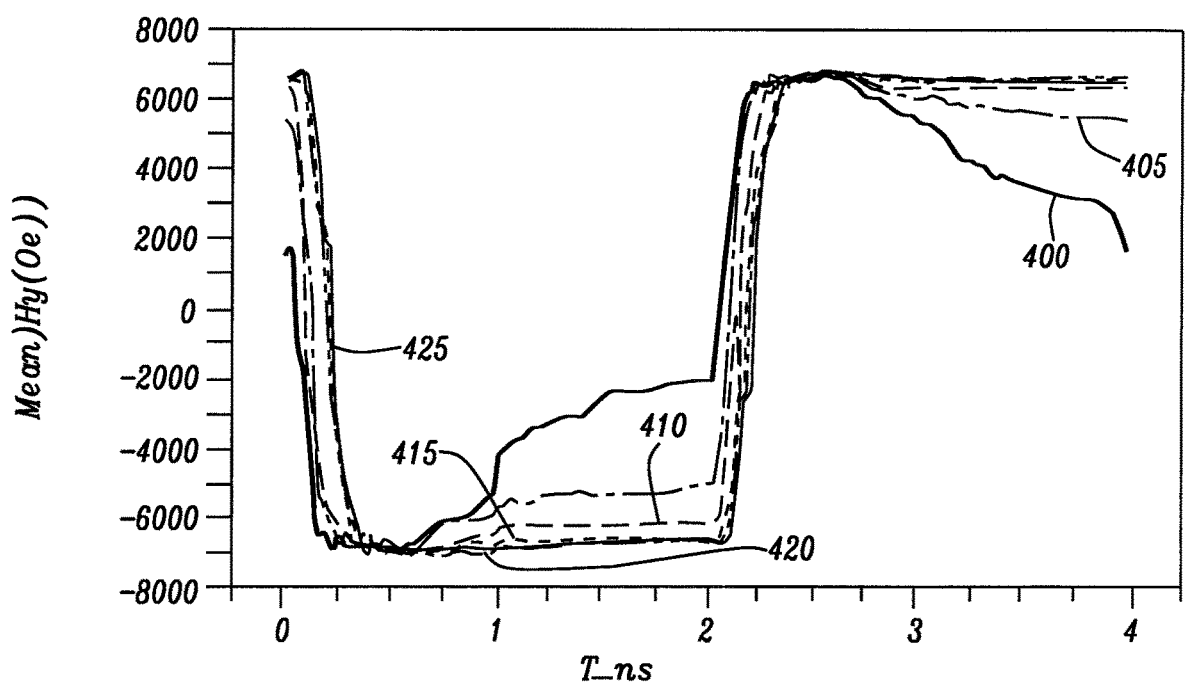
FIG. 9 is a plot of the calculated magnetic field versus time for the write current profiles of FIG. 8 using the controller and preamplifier embodying the principles of the present disclosure.

FIG. 8 is a plot of the write current waveform with a higher overshoot current amplitude set to maintain the same peak current of using the controller 205 and preamplifier 220 embodying the principles of the present disclosure. The plot 350 is with a 0 ma write current. The plot 355 is with a 5 ma write current. The plot 360 is with a 10 ma write current. The plot 365 is with a 20 ma write current. The plot 370 is with a 30 ma write current. The plot 375 is with a 40 ma write current. The peak currents 380a and 380b are held constant for the simulation. FIG. 9 is a plot of the calculated magnetic field Hy in oersted versus time for the write current profiles of FIG. 8 using the controller and preamplifier embodying the principles of the present disclosure. The plot 400 is with a 0 ma write current. The plot 405 is with a 5 ma write current. The plot 410 is with a 10 ma write current. The plot 420 is with a 20 ma write current. The plot 425 is with a 30 ma write current. The plot 430 is with a 40 ma write current. Based on the modeling results, the low write current setting of an approximate range of 15-20 mA causes the erase widths of bits having a greater time period to be reduced by approximately 5 to 10%. The magnetic field Hy amplitude maintains at a reasonable level.

Figure 10:
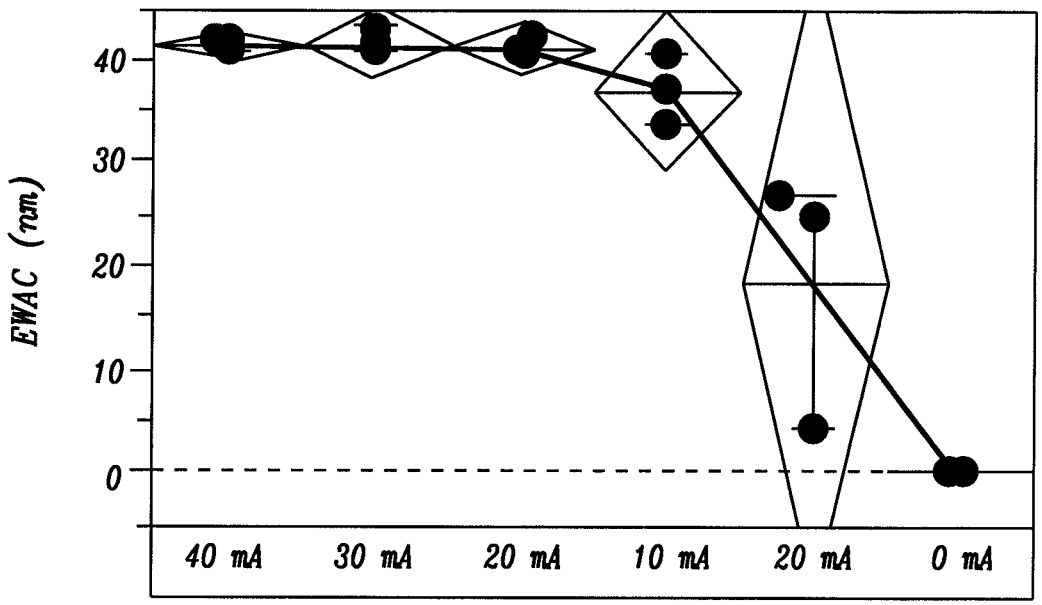
FIG. 10 is a plot of the simulated erase widths of a longer bit structure of the encoded data as a function of the write current setting using the controller and preamplifier embodying the principles of the present disclosure.

FIG. 10 is a plot of the simulated erase widths of a longer bit structure (6 time-periods) of the encoded data as a function of the write current $I_W$ setting using the controller 205 and preamplifier 220 embodying the principles of the present disclosure. As shown in FIG. 9, if the write current $I_W$ is set to less than 30 mA and preferably approximately 15 mA to 20 mA and the overshoot current amplitude OSA is selected to maintain the peak current $I_{PEAK}$, the erase width of longer bit structures (6 time-periods) can be reduced. The magnetic field Hy is maintained at a reasonable level. With this current waveform, as shown in FIG. 8, the areal density capability improvement causes enhanced track density (TPI) improvement due to erase width reduction in longer bit structure (6 time-periods).

Figure 11:
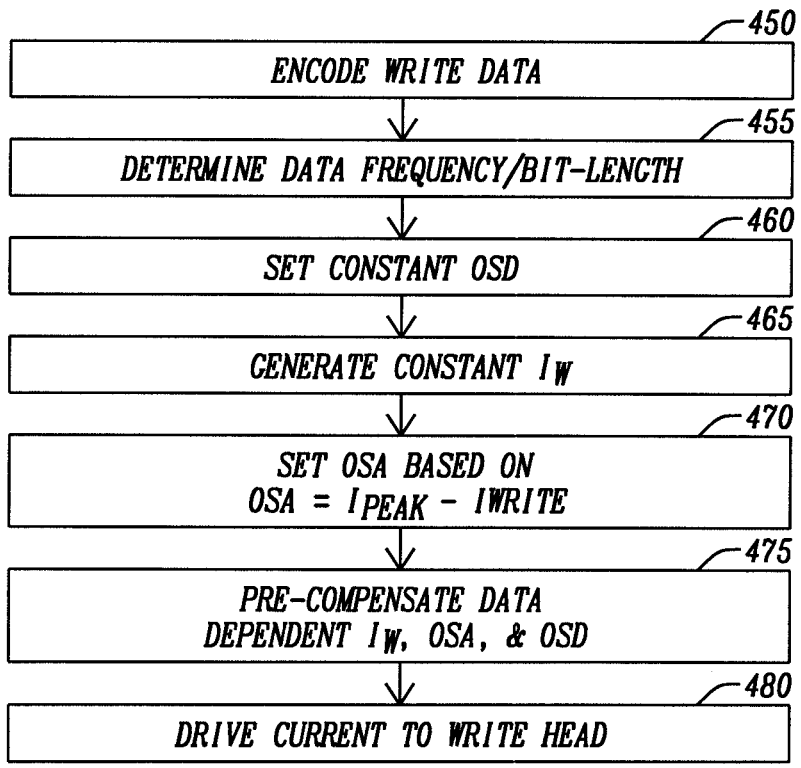
FIG. 11 is a flowchart of a method for writing encoded data to a hard disk drive embodying the principles of the present disclosure.

FIG. 11 is a flowchart of a method for writing encoded data to a hard disk drive embodying the principles of the present disclosure. The method begins with encoding (Box 450) the write data with a differential code such as a Non-Return to Zero Inverted Code (NRZI). The number of time-periods that ascertain the bit length or frequency of the encoded data is determined (Box 455). The overshoot current duration is set (Box 460) and the write current level is set (Box 465) at a low level of an approximate range of 15-20 mA with a maximum of 30 ma. The overshoot current amplitude is determined (Box 470) as the difference of the magnitude of the peak current $I_{PEAK}$ and the magnitude of the write current $I_{WRITE}$.

The encoded input data is pre-compensated (Box 475), and the drive current is transmitted (Box 480) to the write head for writing the data to the magnetic hard drive.

Figure 12:
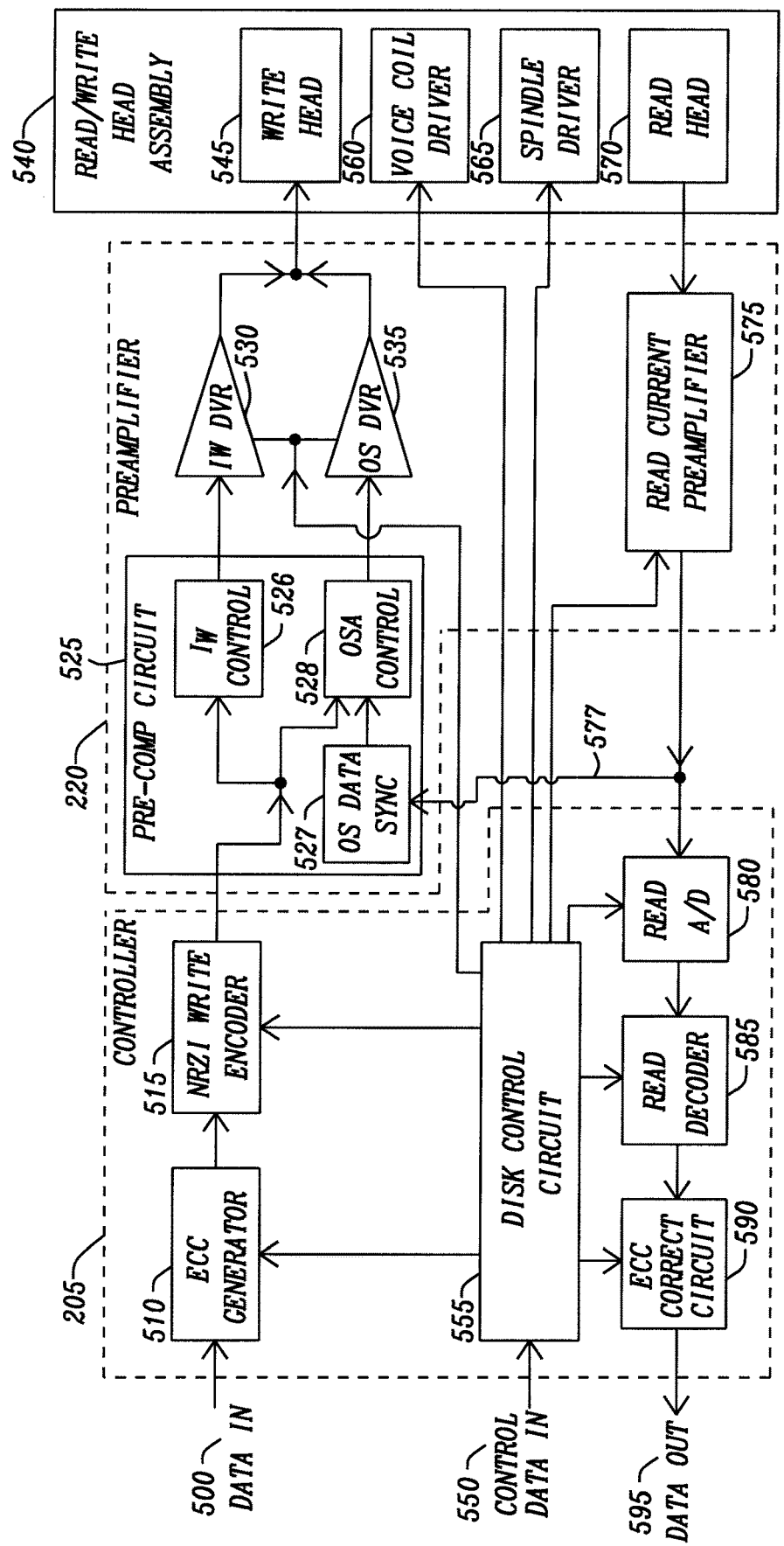
FIG. 12 is a block diagram of a second example of the controller and preamplifier embodying the principles of the present disclosure.

FIG. 12 is a block diagram of a second example of a controller 505 and preamplifier 520 embodying the principles of the present disclosure. The structure of the controller 505 and preamplifier 520 embodying the principles of the present disclosure is essentially identical to the controller 505 and preamplifier 520 of FIG. 5. The input data 500 is transferred to a controller circuit 505 and is applied to an Error Correction Code (ECC) circuit 510 that generates an ECC code from the input data that is appended to the input data. The input data with the appended ECC Code is then an input to an NRZI write encoder 515 that the input data 500 with the appended ECC code to an NRZI format acceptable to the hard disk media for writing the data to the hard disk. The NRZI encoded data is then transferred to a preamplifier 520 and thus to a pre-compensation circuit 525 for conditioning the encoded data to accommodate the transmission line characteristics of the trace 45 of FIG. 1 and the requirements of the magnetic disk 60 for correctly writing the data efficiently to the magnetic disk 60.

In the case of the present example, the pre-compensation circuit 525 has a write current control circuit 526 is configured for receiving the NRZI encoded data and adjusting the magnitude of the write current $I_W$ to a low level less than 30 mA and preferably approximately 15 mA to 20 mA. The pre-compensation circuit 525 has an overshoot current amplitude control circuit 528 that is configured for receiving the NRZI encoded data and adjusting the amplitude of the overshoot current such that the sum of the write current $I_W$ and the overshoot current OSA is equal to the peak current $I_{PEAK}$.

The NRZI encoded data is also applied to the overshoot current amplitude control circuit 528. The overshoot current control circuit 528 is configured for determining the amplitude of the overshoot current OSA as the difference between the peak current $I_{PEAK}$ and the write current $I_W$. An overshoot data synchronizer 527 is connected to a read current preamplifier 575 to receive a pseudorandom read data signal that is applied to the overshoot current amplitude control circuit 528 to enable the different overshoot current amplitude depending on the bit length of the encoded data.

The write control circuit 526 is configured for transferring a write current amplitude signal to the write current driver 530. The overshoot current amplitude control circuit 528 is configured for transferring the overshoot current amplitude signal to the overshoot current driver 535. The outputs of the write current driver 530 and the overshoot current driver 535 are joined together to formed the pre-compensated write current waveform that includes the write current ($I_W$) set to lower current level of less than 30 mA and preferably approximately 15 mA to 20 mA, overshoot current amplitude (OSA), and overshoot current duration (OSD) to boost the magnetic recording field rise time and write sharp transitions between sequential bits.

The pre-compensated write current is transferred to the PMR write head 545 in the read/write head assembly 540. The write current 6 with the overshoot current amplitude OSA and overshoot current duration OSD is applied to the magnetic disk 60 to record the pre-compensated data to the magnetic disk 60.

The write control path is the same as that of FIG. 2, where the write control data 150 is received by the disk controller circuit 155 for supervising the encoding, decoding, synchronization control of the hard disk drive 10 of FIG. 1.

The Read data path is identical to that of FIG. 2, where the read data sensed by the read head 570 is transferred to the read current preamplifier 575 through the read path as described in FIG. 2.

Figure 13:
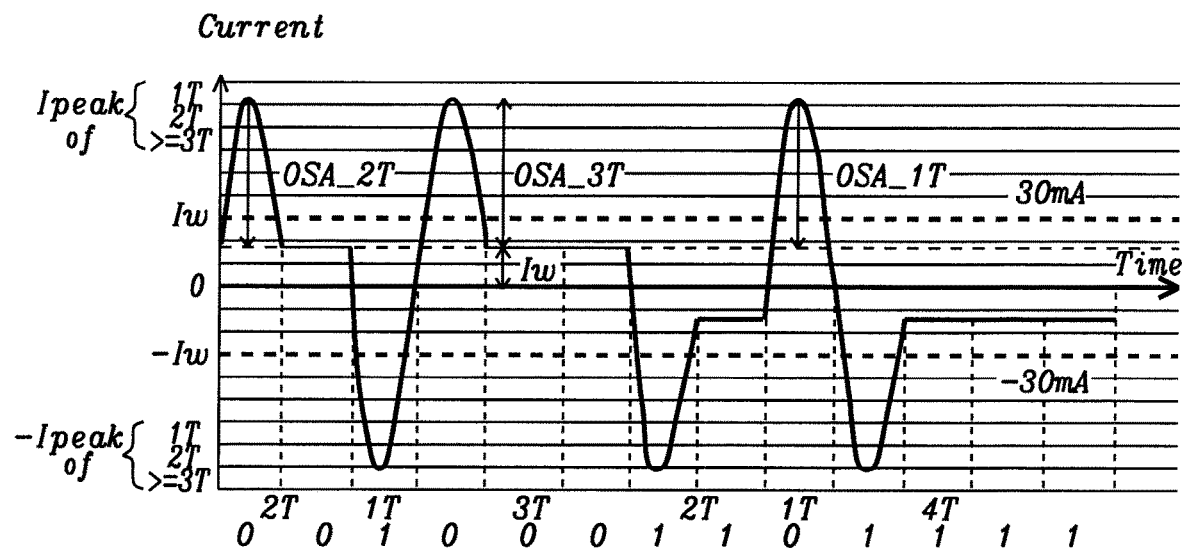
FIG. 13 is a plot of the write current waveform at the output of the preamplifier to the input of the perpendicular magnetic recording (PMR) head of the controller and preamplifier of FIG. 12 embodying the principles of the present disclosure.

FIG. 13 is a plot of the pre-compensated write current waveform at the output of the preamplifier 520 to the input of the perpendicular magnetic recording (PMR) head assembly 540 of the embodying the principles of the present disclosure. The data, as shown, is an NRZI bit pattern (0010001101111) that is applied to the write current control circuit 526 and the overshoot current amplitude control circuit 528. The write current control circuits 526 sets the write current $I_W$ to a low level that is less than 30 mA and preferably approximately 15 mA to 20 mA. The overshoot current amplitude control circuit 528 sets the amplitude and duration of the overshoot current pulse to be set such that the data current waveform is optimized for the best bits per inch (BPI), tracks per inch (TPI) and areal density capability (ADC). The pulse width is determined by the number of 1's or 0's before a change to the opposite digit, as is defined in the NRZI encoding. The first two zeroes form a pulse that is 2 time-periods wide. The first one digit is a single time-period wide with opposite polarity. The second three zeroes are three-time periods wide with a positive polarity. The next two ones are two time-period wide with a negative polarity. The next zero is one time-period wide with a positive polarity. The next four ones are four time-periods wide with a negative polarity. The first time-period of each of the sets of digits is a pulse with an amplitude equal to the peak current $I_{PEAK}$ that is the sum of the write current $I_W$ and the overshoot current OSA. It is noted that the peak current $I_{PEAK}$ for each of the sets of digits is different due to the pseudorandom effect of the overshoot data synchronizer 527 changing the value of the peak current $I_{PEAK}$. The peak current $I_{PEAK}$ and thus the overshoot current OSA is set such that the data having one time-period 1T has a lower amplitude than the data having two time-periods 2T. The data having two time-periods 2T is less than the data having 3 or more time-periods 3T.

Figure 14:
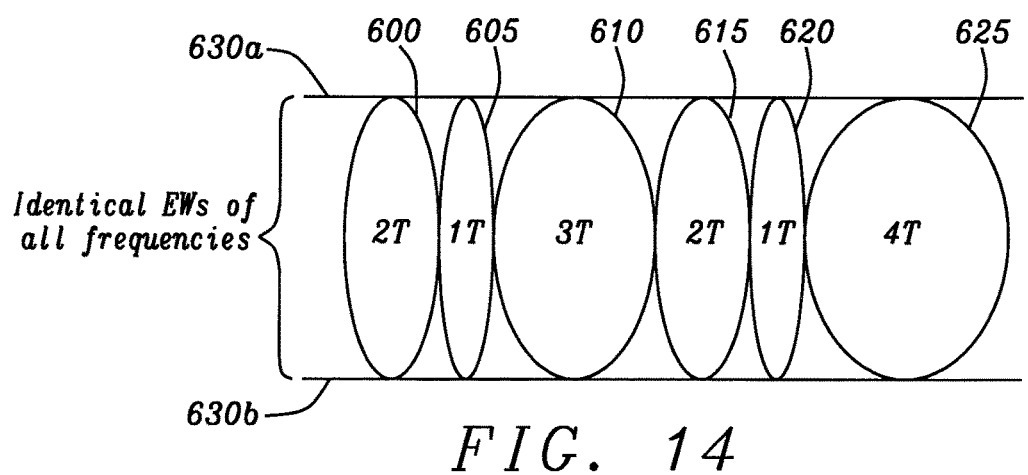
FIG. 14 is a 2D map of recorded bit patterns on the recording media corresponding to the dynamic current waveform in the controller and preamplifier of FIG. 12 embodying the principles of the present disclosure.

FIG. 14 is a 2D map of the recorded bit patterns on the recording media corresponding to the dynamic current waveform in the controller 505 and preamplifier 520, embodying the principles of the present disclosure. The bit sequences are written on the media with the current waveform of FIG. 13. The erase width of the bit sequences having the same data value and thus taking several time-periods is reduced to be the same as the erase width as all bit sequences no matter the number of time-periods for improving the track density or tracks per inch (TPI). The recorded bit patterns 600, 610, and 620 have a positive polarity, and the recorded bit patterns 605, 615, and 625 have a negative polarity. The recorded bit patterns 605 and 620 each occupy a single time-period. The recorded bit patterns 600 and 615 each occupy two time-periods. The recorded bit pattern 610 occupies three time-periods and the recorded bit pattern 625 occupies four time-periods. All the recorded bit patterns 600, 605, 610, 615, 620, and 625 are all set to have the same erase width 630a and 630b for improving the track density or TPI as described above.

Figure 15:
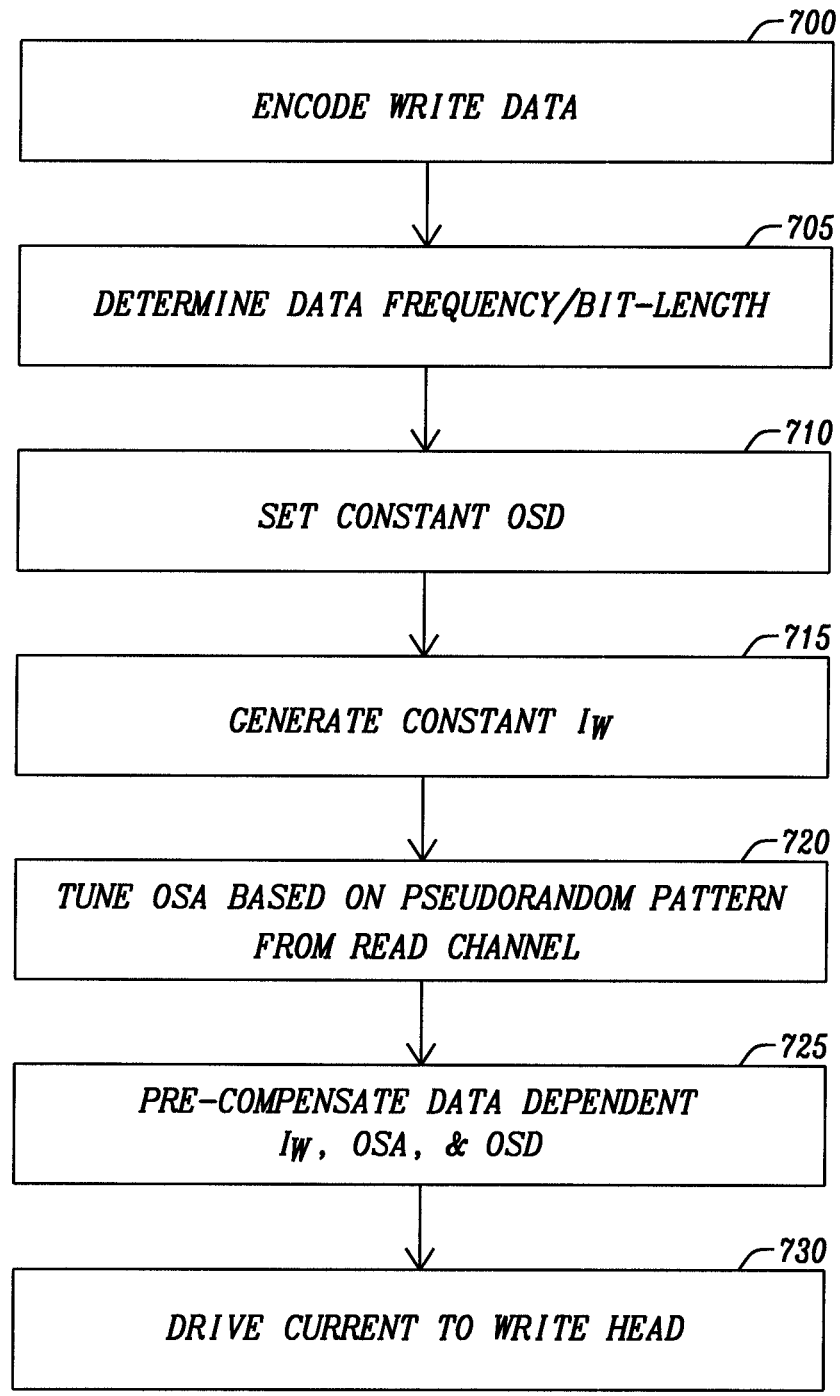
FIG. 15 is a flowchart of another method for writing encoded data to a hard disk drive embodying the principles of the present disclosure.

FIG. 15 is a flowchart of another method for writing encoded data to a hard disk drive embodying the principles of the present disclosure. The method begins with encoding (Box 700) the write data with a differential code such as a Non-Return to Zero Inverted Code (NRZI). The number of time-periods that ascertain the bit length or frequency of the encoded data is determined (Box 705). The overshoot current duration is set (Box 710) and the write current level is set (Box 715) at a low level of an approximate range of 15-20 mA with a maximum of 30 ma. The overshoot current amplitude is determined (Box 720) based on a pseudorandom pattern from the read channel.

The encoded input data is pre-compensated (Box 725), and the drive current is transmitted (Box 730) to the write head for writing the data to the magnetic hard drive.

While this disclosure has been particularly shown and described with reference to the preferred embodiments thereof, it will be understood by those skilled in the art that various changes in form and details may be made without departing from the spirit and scope of the disclosure.

What is claimed is:

1. A write driver circuit within a preamplifier mounted on the head arm assembly of a magnetic hard disk drive comprising:
   a write current driver connected to a write head for writing data on a magnetic hard disk drive;
   a write current control circuit connected to the write current driver and configured for optimizing the write current from the write current driver in a low current range;
   an overshoot current driver connected to an output of the write current driver and the write head for providing an overshoot pulse to the write head for setting the write current for writing the data to the magnetic hard disk drive;
   an overshoot current control circuit connected to the overshoot current driver and configured for adjusting the overshoot currents amplitudes dependent upon an encoded data width; and
   an overshoot data synchronizer connected between a read current preamplifier and the overshoot current control circuit and configured for generating a pseudorandom signal pattern for varying the overshoot current amplitudes dependent upon an encoded data width.

2. The write driver circuit of claim 1 wherein the write current is less than 30 mA.

3. The write driver circuit of claim 2 wherein the write current is in a range of approximately 15 mA to 20 mA.

4. The write driver circuit of claim 1 wherein the encoded data widths have equal erase widths.

5. A method for writing encoded data to a hard disk drive comprising the steps of:
   optimizing the write current in a low current range;
   adjusting the overshoot currents amplitudes dependent upon an encoded data width;
   generating a pseudorandom signal pattern for varying the overshoot current amplitudes dependent upon an encoded data width; and
   equalizing erase widths for all the encoded data widths of the encoded data.

6. The method of claim 5, wherein the write current is less than 30 mA.

7. The method of claim 6, wherein the write current is in a range of approximately 15 mA to 20 mA.

8. The method of claim 5, wherein the varying overshoot current amplitudes ensure the encoded data widths have equal erase widths.

* * * * *